US009577478B2

(12) United States Patent
Post

(10) Patent No.: US 9,577,478 B2
(45) Date of Patent: Feb. 21, 2017

(54) AXIAL FLUX MOTOR WITH STATOR PRE-LOAD

(71) Applicant: Regal Beloit America, Inc., Beloit, WI (US)

(72) Inventor: Steven W. Post, Cassville, MO (US)

(73) Assignee: Regal Beloit America, Inc., Beloit, WI (US)

(*) Notice: Subject to any disclaimer, the term of this patent is extended or adjusted under 35 U.S.C. 154(b) by 795 days.

(21) Appl. No.: 13/904,826

(22) Filed: May 29, 2013

(65) Prior Publication Data
US 2014/0354102 A1 Dec. 4, 2014

(51) Int. Cl.
*H02K 1/18* (2006.01)
*H02K 5/24* (2006.01)
*H02K 1/27* (2006.01)

(52) U.S. Cl.
CPC ............... *H02K 1/182* (2013.01); *H02K 5/24* (2013.01); *H02K 1/2793* (2013.01)

(58) Field of Classification Search
CPC .......... H02K 1/18; H02K 1/182; H02K 1/185; H02K 1/187; H02K 1/2793; H02K 5/15; H02K 5/20; H02K 21/24; H02K 5/04; H02K 5/24
(Continued)

(56) References Cited

U.S. PATENT DOCUMENTS 3,571,637 A    3/1971  Henningsen et al.
4,306,168 A *  12/1981 Peachee .................. H02K 5/15
                                                      310/216.127
(Continued)

FOREIGN PATENT DOCUMENTS

GB    1403522 A    8/1975
GB    2255452 A    11/1992
(Continued)

OTHER PUBLICATIONS

Hirose, Machine Translation of JP2013062892, Apr. 2013.*
International Search Report for PCT/US2011/029378 dated Jun. 20, 2011.

*Primary Examiner* — Quyen Leung
*Assistant Examiner* — Eric Johnson
(74) *Attorney, Agent, or Firm* — Thompson Coburn LLP

(57) ABSTRACT

A motor comprises a stator assembly, a rotor assembly having a stator core, and a stator cup adjacent the stator core. The inside surface of the stator cup comprises a plurality of aligned regions and a plurality of pressure regions. Each of the plurality of aligned regions is axially aligned with a corresponding one of a plurality of fastener-engaging regions of the stator cup. Each of the plurality of pressure regions is spaced from each of the plurality of aligned regions. A plurality of fastening portions operatively engages the fastener-engaging regions and operatively engages the stator core in a manner urging the stator core and the stator cup toward one another. Urging of the stator core and the stator cup toward one another by the plurality of fastening portions causes the stator core to exert pressure on the plurality of pressure regions. The pressure being exerted on the plurality of pressure regions by the stator core as a result of the fastening portions urging the stator core and the stator cup toward one another is greater than pressure being exerted on the plurality of aligned regions by the stator core.

23 Claims, 4 Drawing Sheets

(58) Field of Classification Search
USPC .............. 310/400–417, 156.32–37, 216.058,
310/216.083–216.085, 216.114,
310/216.118, 216.127, 216.133
See application file for complete search history.

(56) References Cited

U.S. PATENT DOCUMENTS

| | | | |
|---|---|---|---|
| 4,629,920 A * | 12/1986 | Hermann | H02K 21/24 310/156.29 |
| 4,745,314 A * | 5/1988 | Nakano | H02K 1/20 174/DIG. 19 |
| 5,874,796 A | 2/1999 | Petersen | |
| 8,421,301 B2 * | 4/2013 | Hsu | H02K 1/182 310/216.118 |
| 2010/0019613 A1 | 1/2010 | Saban et al. | |
| 2012/0086303 A1* | 4/2012 | Hsu | H02K 1/182 310/216.113 |
| 2013/0069467 A1 | 3/2013 | Smith et al. | |

FOREIGN PATENT DOCUMENTS

| | | | |
|---|---|---|---|
| JP | 2013062892 A * | 4/2013 | |
| WO | 02/03527 A2 | 1/2002 | |
| WO | 2011/119574 A1 | 9/2011 | |

* cited by examiner

AXIAL FLUX MOTOR WITH STATOR PRE-LOAD

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to motors which generate magnetic forces having axial components.

General Background

Axial flux motors have been historically noisy. It is desirable to reduce the noise of axial flux motors and other motors which generate magnetic forces having axial components.

SUMMARY OF THE INVENTION

The present invention overcomes some of the disadvantages of axial flux motors and other motors which generate magnetic forces having axial components.

One aspect of the invention is an axial flux motor comprising a stator assembly, a rotor assembly, a stator cup, and a plurality of fasteners. The stator assembly comprises a stator core. The rotor assembly is adjacent the stator assembly and rotatable relative to the stator assembly about a rotor axis. The stator cup is adjacent the stator core. The stator cup comprises a plurality of through fastener-receiving openings, an inside surface opposing the stator core, and an outside surface facing away from the stator core. The inside surface of the stator cup comprises a plurality of aligned regions and a plurality of pressure regions. Each one of the plurality of aligned regions is at least twice as wide as and circumscribing a corresponding one of the plurality of fastener-receiving openings. Each one of the plurality of fastener-receiving openings is closer to its corresponding one of the plurality of aligned regions than to any of the plurality of pressure regions. The plurality of fasteners extend through the fastener-receiving openings and urge the stator core and the stator cup toward one another such that the inside surface of the stator cup exerts forces against the stator core and the stator core exerts forces against the inside surface of the stator cup. The stator cup and the stator core are shaped and configured such that the urging of the stator core and the stator cup toward one another by the plurality of fasteners causes the stator core to exert pressure on the plurality of pressure regions. The stator cup and the stator core are shaped and configured such that the pressure being exerted on the plurality of pressure regions by the stator core as a result of the fasteners urging the stator core and the stator cup toward one another is greater than pressure being exerted on the plurality of aligned regions by the stator core as a result of the fasteners urging the stator core and the stator cup toward one another.

Another aspect of the invention is an axial flux motor comprising a stator assembly, a rotor assembly, a stator cup, and a plurality of fasteners. The stator assembly comprises a stator core. The rotor assembly is adjacent the stator assembly and rotatable relative to the stator assembly about a rotor axis. The rotor axis defines an axial direction. The stator cup is adjacent the stator core. The stator cup comprises a plurality of through fastener-receiving openings, an inside surface opposing the stator core, and an outside surface facing away from the stator core. The inside surface of the stator cup comprises a plurality of recessed regions and a plurality of pressure regions. Each one of the plurality of recessed regions circumscribes a corresponding one of the plurality of fastener-receiving openings. Each one of the plurality of fastener-receiving openings is closer to its corresponding one of the plurality of recessed regions than to any of the plurality of pressure regions. The plurality of fasteners extend through the fastener-receiving openings and urge the stator core and the stator cup toward one another such that the inside surface of the stator cup exerts forces against the stator core and the stator core exerts forces against the inside surface of the stator cup. The stator cup and the stator core are shaped and configured such that the urging of the stator core and the stator cup toward one another by the plurality of fasteners causes the stator core to exert pressure on the plurality of pressure regions. The stator cup and the stator core are shaped and configured such that the stator core does not contact the stator core within the plurality of recessed regions.

Yet another aspect of the invention is a motor comprising a stator assembly, a rotor assembly, a stator cup, and a plurality of fastening portions. The stator assembly comprises a stator core. The rotor assembly is adjacent the stator assembly and rotatable relative to the stator assembly about a rotor axis. The rotor axis defines an axial direction. The stator cup is adjacent the stator core. The stator cup comprises a plurality of fastener-engaging regions, an inside surface opposing the stator core, and an outside surface facing away from the stator core. The inside surface of the stator cup comprises a plurality of aligned regions and a plurality of pressure regions. Each of the plurality of aligned regions is axially aligned with a corresponding one of the plurality of fastener-engaging regions. Each of the plurality of pressure regions is spaced from each of the plurality of aligned regions. The plurality of fastening portions operatively engage the fastener-engaging regions and operatively engage the stator core in a manner urging the stator core and the stator cup toward one another such that the inside surface of the stator cup exerts forces against the stator core and the stator core exerts forces against the inside surface of the stator cup. The stator cup and the stator core are shaped and configured such that the urging of the stator core and the stator cup toward one another by the plurality of fastening portions causes the stator core to exert pressure on the plurality of pressure regions. The stator cup and the stator core are shaped and configured such that the pressure being exerted on the plurality of pressure regions by the stator core as a result of the fastening portions urging the stator core and the stator cup toward one another is greater than pressure being exerted on the plurality of aligned regions by the stator core as a result of the fastening portions urging the stator core and the stator cup toward one another. The rotor assembly and the stator assembly are configured and arranged such that operation of the motor creates magnetic forces having axial components which intermittently urge portions of the stator core axially toward the rotor assembly. The plurality of fastening portions, the stator core and the stator cup are configured and arranged such that the stator core continuously exerts pressure on each of the plurality of pressure regions during operation of the motor.

Further features and advantages of the present invention, as well as the operation of the invention, are described in detail below with reference to the accompanying drawings.

Figure 1:
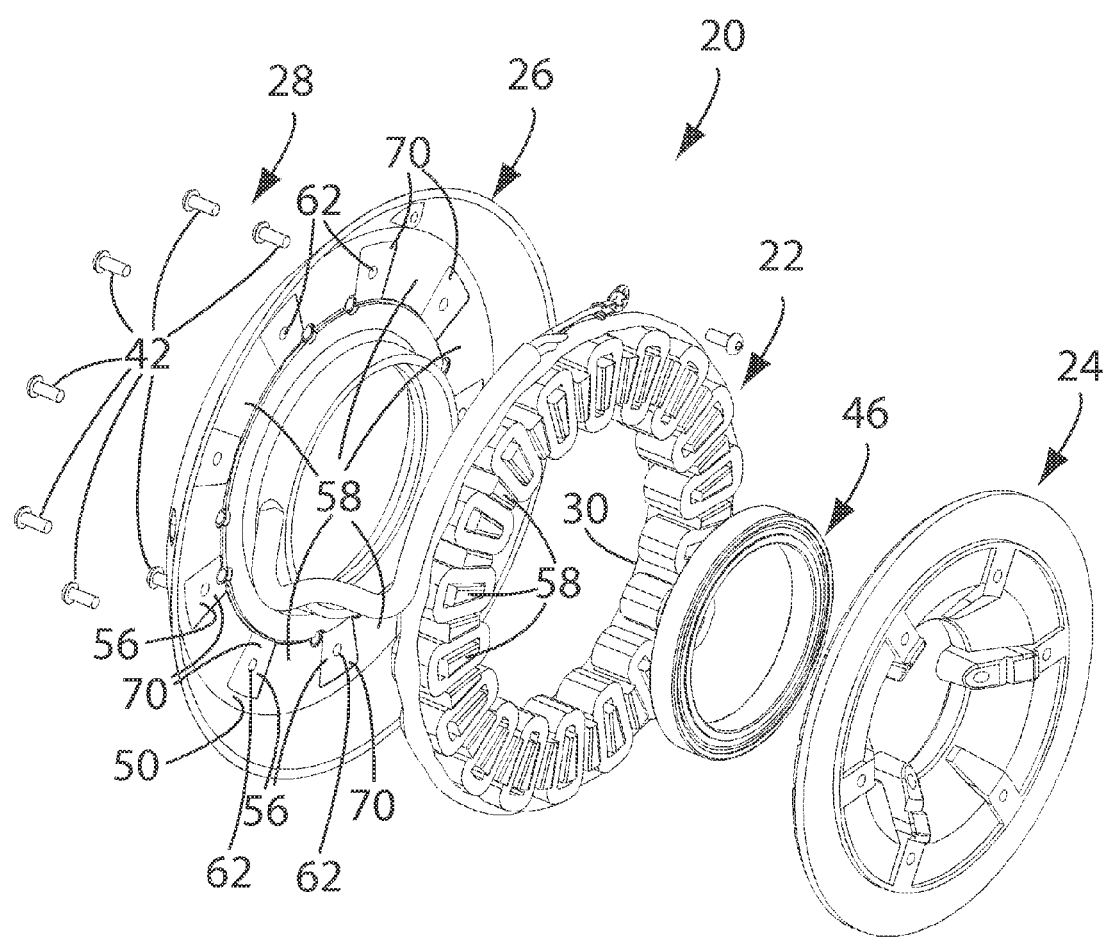
FIG. 1 is an exploded perspective view of an embodiment of a motor in accordance with the present invention, the motor having a stator assembly, a rotor assembly and a stator cup.
Figure 2:
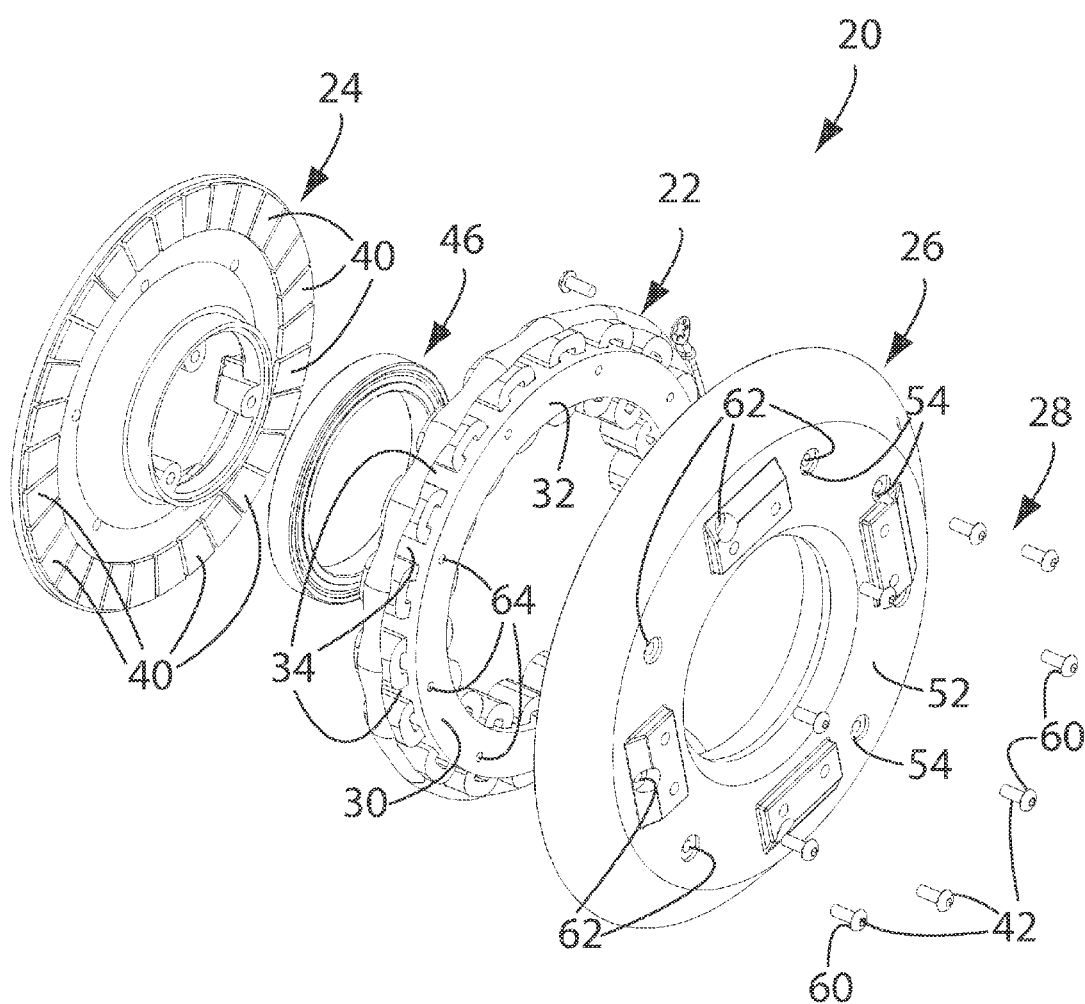
FIG. 2 is an exploded perspective view of the motor of FIG. 1, but taken from an angle shifted 180° from the view of FIG. 1 and showing an outside surface of the stator cup.
Figure 4:
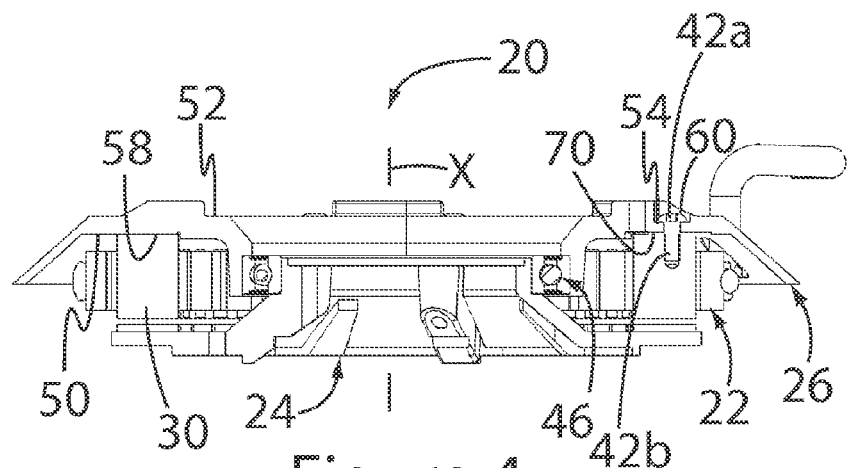
FIG. 4 is a sectional view taken along the plane of line 4-4 of FIG. 3.
Figure 3:
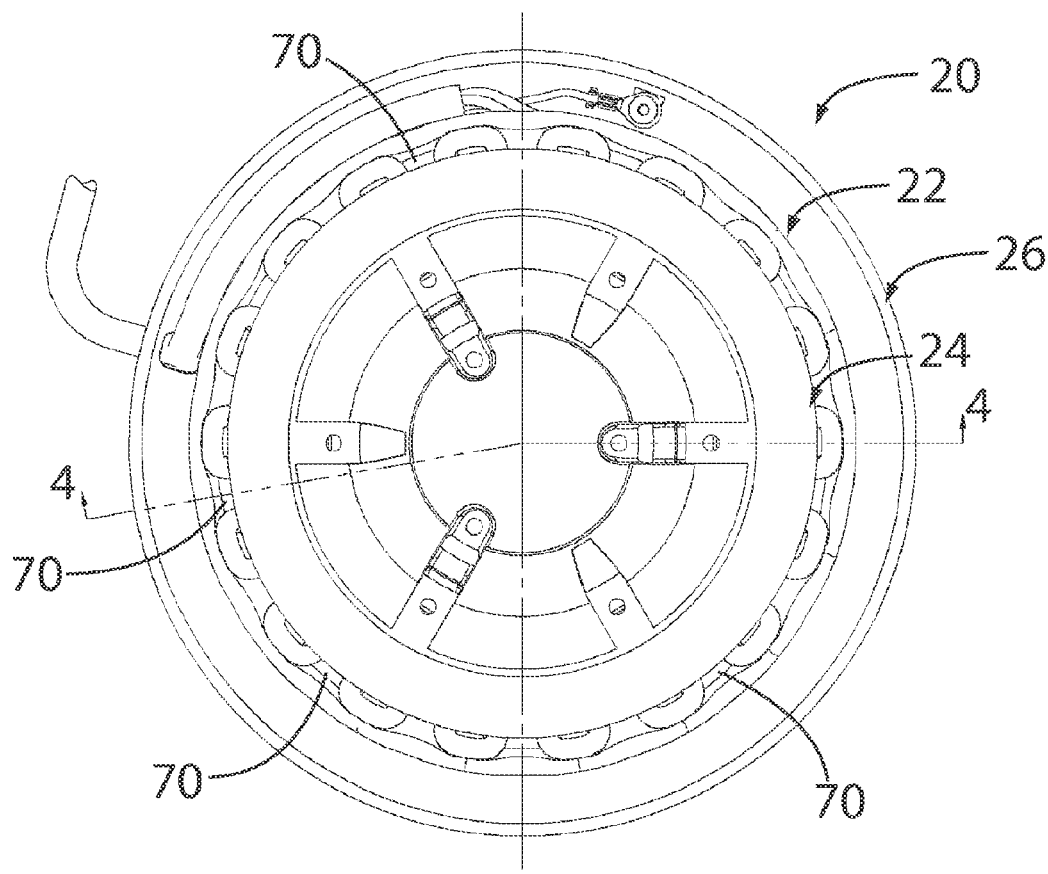
FIG. 3 is a top plan view of the motor of FIGS. 1 and 2.

Reference numerals in the written specification and in the drawing figures indicate corresponding items.

DETAILED DESCRIPTION

A preferred embodiment of a motor in accordance with the present invention is generally indicated by the reference numeral 20. The motor 20 comprises a stator assembly, generally indicated at 22, a rotor assembly, generally indicated at 24, a stator cup, generally indicated at 26, and a fastening mechanism, generally indicated at 28. The stator assembly 22 comprises a stator core 30. The stator core 30 comprises a stator base 32 and a plurality of stator teeth 34 extending axially from the stator base. The stator teeth 34 are arranged circumferentially around the stator base 32 in an alternating fashion between wound teeth and non-wound teeth. The rotor assembly 24 comprises a plurality of permanent magnets 40. The permanent magnets 40 are preferably high energy magnets, such as neodymium magnets, running at low air gaps to generate maximum efficiency. Alternatively, the motor 20 could employ one or more magnets, each having multiple pole pairs. The stator cup 26 is adjacent the stator assembly 22, and the stator assembly is secured to the stator cup via the fastening mechanism 28. The fastening mechanism 28 preferably comprises a plurality of fasteners 42. But other types of fastening mechanisms (e.g., a clamping mechanism) may be employed without departing from the scope of this invention. The rotor assembly 24 is adjacent the stator assembly 22. The rotor assembly 24 is rotatably coupled to the stator cup 26 via a suitable bearing assembly, generally indicated at 46 for rotation relative to the stator about a rotor axis X. The rotor axis X defines an axial direction.

The stator cup 26 comprises an inside surface 50 opposing the stator core 30, and an outside surface 52 facing away from the stator core. The stator cup 26 includes a plurality of fastener-engaging regions 54, preferably spaced circumferentially around the stator cup 26. Preferably, the fastener-engaging regions 54 are on the outside surface 52 of the stator cup 26. The inside surface 50 of the stator cup 26 comprises a plurality of aligned regions 56 and a plurality of pressure regions 58. Each of the plurality of aligned regions 56 is axially aligned with a corresponding one of the plurality of fastener-engaging regions 54. Each of the plurality of pressure regions 58 is spaced from each of the plurality of aligned regions 56. The fastener-engaging regions 54 engage, and are engaged by, cup-engaging portions 60 of the fastening mechanism 28. In the present embodiment, the cup-engaging portions comprise fastener heads 42*a* of the plurality of fasteners 42. The fastening mechanism 28 further includes stator-engaging portions. In the present embodiment, the stator-engaging portions comprise threaded fastener shanks 42*b* of the fasteners 42. The cup-engaging portions and the stator-engaging portions constitute fastening portions of the fastening mechanism 28. The cup-engaging portions of the fastening mechanism 28 operatively engage the fastener-engaging regions 54 and operatively engage the stator core 30 in a manner urging the stator core and the stator cup 26 toward one another such that the inside surface 50 of the stator cup exerts forces against the stator core and the stator core exerts forces against the inside surface of the stator cup. The stator cup 26 and the stator core 30 are shaped and configured such that the urging of the stator core and the stator cup toward one another by the plurality of fastening portions causes the stator core to exert pressure on the plurality of pressure regions 58. The stator cup 26 and the stator core 30 are shaped and configured such that the pressure being exerted on the plurality of pressure regions 58 by the stator core as a result of the fastening portions urging the stator core and the stator cup toward one another is greater than pressure being exerted on the plurality of aligned regions 56 by the stator core as a result of the fastening portions urging the stator core and the stator cup toward one another. The rotor assembly 24 and the stator assembly 22 are configured and arranged such that operation of the motor creates magnetic forces having axial components which intermittently urge portions of the stator core axially toward the rotor assembly. Preferably, the motor 20 is an axial flux motor, but it is to be understood the motor could alternatively be of other motor types in which operation of the motor creates magnetic forces having axial components which intermittently urge portions of the stator core axially toward the rotor assembly.

The plurality of fastening portions, the stator core 30 and the stator cup 26 are configured and arranged such that the stator core continuously exerts pressure on each of the plurality of pressure regions 58 during operation of the motor 20, i.e., during all normal operations of the motor. Preferably, the stator cup 26 and the stator core 30 are shaped and configured such that the urging of the stator core and the stator cup toward one another by the fastening mechanism 28 does not result in the stator core exerting any pressure on any of the plurality of aligned regions 58. Preferably, the stator cup 26 and the stator core 30 are shaped and configured such that each of the plurality of aligned regions 58 is spaced from and remains spaced from the stator core during operation of the motor 20.

In the present embodiment, the stator cup 26 includes a plurality of through fastener-receiving openings 62. Each fastener-receiving opening 62 of the stator cup 26 is aligned with a corresponding one of the plurality of fastener-engaging regions 54 and aligned with a corresponding one of the aligned regions on the inside surface 50 of the stator cup. Each of the plurality of aligned regions 56 of the inside surface 50 of the stator cup 26 is at least twice as wide as and circumscribes a corresponding one of the plurality of fastener-receiving openings 62. In the present embodiment, the fastener shanks 42*b* of the fasteners 42 project axially through the fastener-receiving opinions 62 and are threaded axially into threaded holes 64 in the stator base 32. Preferably, each threaded hole 64 is aligned with a corresponding one of the non-wound stator teeth. In the present embodiment, the inside surface 50 of the stator cup 26 includes a plurality of recessed regions 70. Each one of the plurality of aligned regions 56 is within a corresponding one of the plurality of recessed regions 70. The recessed regions 70 function as preload pockets such that tensioning of the fasteners 42 results in preloading in the pressure regions 58 to prevent or to at least minimize relative movement between the stator core 30 and the stator cup 26 in the vicinity of the pressure regions and thereby minimize noise caused by the axial components of the magnetic forces acting on the stator core during operation of the motor 20.

Figure 5:
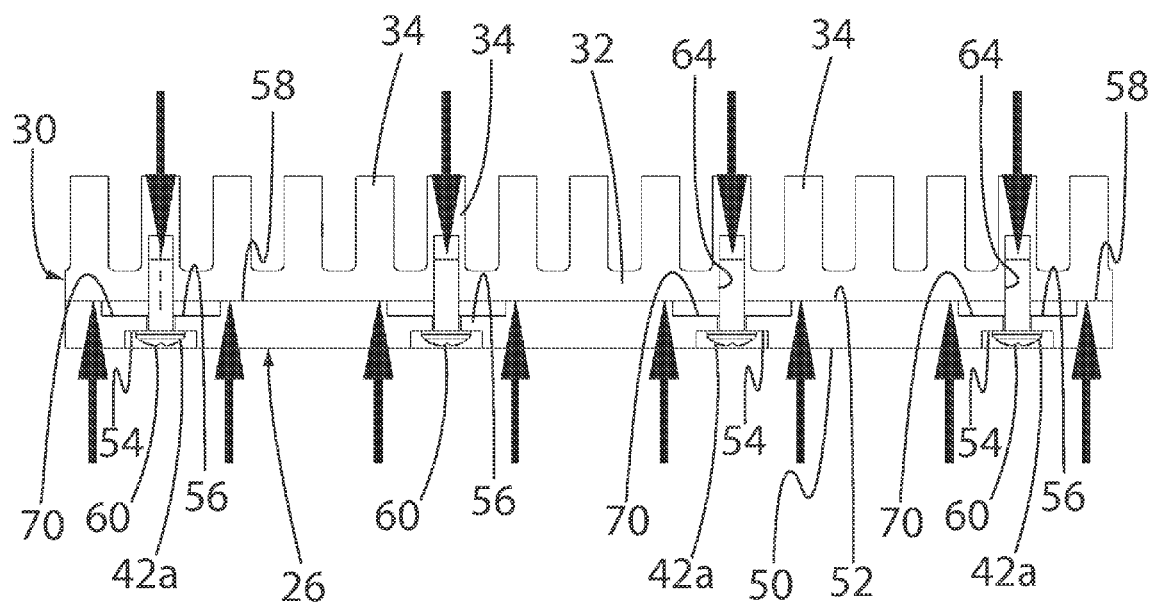
FIG. 5 is a schematic view of the motor of FIGS. 1-4 with arrows representative of forces as a result of preload of the stator assembly with respect to the stator cup.

FIG. 5 is a schematic view of the motor 20 of the present embodiment. The large vertical arrows represent forces acting on the stator core 30 and the stator cup 26 as a result of the preload caused by the fasteners 42. Because of the presence of the recessed regions, the stator core 30 and the stator cup 26 do not press against one another in the vicinity of the fasteners or within the aligned regions 56. Instead, the pressing forces are in the regions between the fasteners or in the pressure regions 58. The pressing forces prevent or minimize relative movement between the stator cup 26 and the stator core in the vicinity of the pressure regions 58.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

What is claimed is:

1. An axial flux motor comprising:
an axial flux stator assembly comprising a stator core;
an axial flux rotor assembly, the rotor assembly being adjacent the stator assembly and rotatable relative to the stator assembly about a rotor axis;
a stator cup adjacent the stator core comprising a plurality of through fastener-receiving openings, an inside surface opposing the stator core, and an outside surface facing away from the stator core, the inside surface of the stator cup comprising a plurality of aligned regions and a plurality of pressure regions, each one of the plurality of aligned regions being at least twice as wide as and circumscribing a corresponding one of the plurality of fastener-receiving openings, each one of the plurality of fastener-receiving openings being closer to its corresponding one of the plurality of aligned regions than to any of the plurality of pressure regions;
a plurality of fasteners extending through the fastener-receiving openings and urging the stator core and the stator cup toward one another such that the inside surface of the stator cup exerts forces against the stator core and the stator core exerts forces against the inside surface of the stator cup;
the stator cup and the stator core being shaped and configured such that the urging of the stator core and the stator cup toward one another by the plurality of fasteners causes the stator core to exert pressure on the plurality of pressure regions, the stator cup and the stator core being shaped and configured such that the pressure being exerted on the plurality of pressure regions by the stator core as a result of the fasteners urging the stator core and the stator cup toward one another is greater than pressure being exerted on the plurality of aligned regions by the stator core as a result of the fasteners urging the stator core and the stator cup toward one another.

2. An axial flux motor as set forth in claim 1 wherein the stator cup and the stator core are shaped and configured such that the urging of the stator core and the stator cup toward one another by the plurality of fasteners does not result in the stator core exerting any pressure on any of the plurality of aligned regions.

3. An axial flux motor as set forth in claim 2 wherein the rotor assembly and the stator assembly are configured and arranged such that operation of the motor creates magnetic forces which intermittently urge portions of the stator core axially toward the rotor assembly, and wherein the plurality of fasteners, the stator core and the stator cup are configured and arranged such that the stator core continuously exerts pressure on each of the plurality of pressure regions during operation of the motor.

4. An axial flux motor as set forth in claim 1 wherein the inside surface of the stator cup includes a plurality of recessed regions, and wherein each one of the plurality of aligned regions is within a corresponding one of the plurality of recessed regions.

5. An axial flux motor as set forth in claim 1 wherein the rotor assembly and the stator assembly are configured and arranged such that operation of the motor creates magnetic forces which intermittently urge portions of the stator core axially toward the rotor assembly, and wherein the plurality of fasteners, the stator core and the stator cup are configured and arranged such that the stator core continuously exerts pressure on each of the plurality of pressure regions during operation of the motor.

6. An axial flux motor as set forth in claim 1 wherein the stator cup and the stator core are shaped and configured such that each of the plurality of aligned regions is spaced from and remains spaced from the stator core during operation of the motor.

7. An axial flux motor as set forth in claim 1 wherein to rotor assembly comprises a plurality of permanent magnets.

8. An axial flux motor as set forth in claim 1 wherein the rotor assembly comprises at least one magnet, said at least one magnet having multiple pole pairs.

9. An axial flux motor comprising:
an axial flux stator assembly comprising a stator core;
an axial flux rotor assembly, the rotor assembly being adjacent the stator assembly and rotatable relative to the stator assembly about a rotor axis, the rotor axis defining an axial direction;
a stator cup adjacent the stator core comprising a plurality of through fastener-receiving openings, an inside surface opposing the stator core, and an outside surface facing away from the stator core, the inside surface of the stator cup comprising a plurality of recessed regions and a plurality of pressure regions, each one of the plurality of recessed regions circumscribing a corresponding one of the plurality of fastener-receiving openings, each one of the plurality of fastener-receiving openings being closer to its corresponding one of the plurality of recessed regions than to any of the plurality of pressure regions;

a plurality of fasteners extending through the fastener-receiving openings and urging the stator core and the stator cup toward one another such that the inside surface of the stator cup exerts forces against the stator core and the stator core exerts forces against the inside surface of the stator cup;

the stator cup and the stator core being shaped and configured such that the urging of the stator core and the stator cup toward one another by the plurality of fasteners causes the stator core to exert pressure on the plurality of pressure regions, the stator cup and the stator core being shaped and configured such that the stator core does not contact the stator cup within the plurality of recessed regions.

10. An axial flux motor as set forth in claim 9 wherein to rotor assembly comprises a plurality of permanent magnets.

11. An axial flux motor as set forth in claim 10 wherein the stator core comprises a stator base and a plurality of stator teeth, the plurality of stator teeth being positioned circumferentially about the rotor axis and extending axially from the stator base, the rotor assembly and the stator assembly being arranged and configured such that the permanent magnets of the rotor assembly are spaced axially from the stator teeth.

12. An axial flux motor as set forth in claim 9 wherein the rotor assembly and the stator assembly are configured and arranged such that operation of the motor creates magnetic forces which intermittently urge portions of the stator core axially toward the rotor assembly, and wherein the plurality of fasteners, the stator core and the stator cup are configured and arranged such that the stator core continuously exerts pressure on each of the plurality of pressure regions during operation of the motor.

13. An axial flux motor as set forth in claim 9 wherein the rotor assembly comprises at least one magnet, said at least one magnet having multiple pole pairs.

14. A motor comprising:
a stator assembly comprising a stator core;
a rotor assembly, the rotor assembly being adjacent the stator assembly and rotatable relative to the stator assembly about a rotor axis, the rotor axis defining an axial direction;
a stator cup adjacent the stator core comprising a plurality of fastener-engaging regions, an inside surface opposing the stator core, and an outside surface facing away from the stator core, the inside surface of the stator cup comprising a plurality of aligned regions and a plurality of pressure regions, each of the plurality of aligned regions being axially aligned with a corresponding one of the plurality of fastener-engaging regions, each of the plurality of pressure regions being spaced from each of the plurality of aligned regions;
a plurality of fastening portions operatively engaging the fastener-engaging regions and operatively engaging the stator core in a manner urging the stator core and the stator cup toward one another such that the inside surface of the stator cup exerts forces against the stator core and the stator core exerts forces against the inside surface of the stator cup;

the stator cup and the stator core being shaped and configured such that the urging of the stator core and the stator cup toward one another by the plurality of fastening portions causes the stator core to exert pressure on the plurality of pressure regions, the stator cup and the stator core being shaped and configured such that the pressure being exerted on the plurality of pressure regions by the stator core as a result of the fastening portions urging the stator core and the stator cup toward one another is greater than pressure being exerted on the plurality of aligned regions by the stator core as a result of the fastening portions urging the stator core and the stator cup toward one another;

the rotor assembly and the stator assembly being configured and arranged such that operation of the motor creates magnetic forces having axial components which intermittently urge portions of the stator core axially toward the rotor assembly;

the plurality of fastening portions, the stator core and the stator cup being configured and arranged such that the stator core continuously exerts pressure on each of the plurality of pressure regions during operation of the motor.

15. A motor as set forth in claim 14 wherein the stator cup and the stator core are shaped and configured such that the urging of the stator core and the stator cup toward one another by the plurality of fastening portions does not result in the stator core exerting any pressure on any of the plurality of aligned regions.

16. A motor as set forth in claim 14 wherein the stator cup and the stator core are shaped and configured such that each of the plurality of aligned regions is spaced from and remains spaced from the stator core during operation of the motor.

17. A motor as set forth in claim 14 wherein the plurality of fastening portions constitute portions of a plurality of fasteners.

18. A motor as set forth in claim 17 wherein the stator cup includes a plurality of through fastener-receiving openings, each one of the plurality of aligned regions being at least twice as wide as and circumscribing a corresponding one of the plurality of fastener-receiving openings.

19. A motor as set forth in claim 18 wherein each of the plurality of fasteners includes a fastener shank projecting axially through a corresponding one of the plurality of through fastener-receiving openings in the stator cup and secured to the stator core.

20. A motor as set forth in claim 14 wherein the inside surface of the stator cup includes a plurality of recessed regions, and wherein each one of the plurality of aligned regions is within a corresponding one of the plurality of recessed regions.

21. A motor as set forth in claim 14 wherein the motor comprises an axial flux motor.

22. A motor as set forth in claim 14 wherein the rotor assembly comprises at least one magnet, said at least one magnet having multiple pole pairs.

23. A motor as set forth in claim 14 wherein to rotor assembly comprises a plurality of permanent magnets.

* * * * *